(12) United States Patent
Gallagher et al.

(10) Patent No.: US 9,586,631 B2
(45) Date of Patent: Mar. 7, 2017

(54) CAST LOAD STRUCTURE FOR VEHICLE BODY TO FRAME MOUNT

(71) Applicant: FORD GLOBAL TECHNOLOGIES, LLC, Dearborn, MI (US)

(72) Inventors: Stephen William Gallagher, Bloomfield Hills, MI (US); Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/319,203

(22) Filed: Jun. 30, 2014

(65) Prior Publication Data

US 2015/0375806 A1    Dec. 31, 2015

(51) Int. Cl.
*B62D 33/077* (2006.01)
*B62D 21/09* (2006.01)
*B62D 29/00* (2006.01)
*B62D 21/02* (2006.01)
*B62D 25/20* (2006.01)

(52) U.S. Cl.
CPC .......... *B62D 33/077* (2013.01); *B62D 21/02* (2013.01); *B62D 21/09* (2013.01); *B62D 25/2018* (2013.01); *B62D 25/2054* (2013.01); *B62D 29/008* (2013.01)

(58) Field of Classification Search
CPC .... B62D 25/00; B62D 33/077; B62D 29/008; B62D 21/09; B62D 21/02; B62D 25/2018; B62D 25/2054
USPC ................. 296/35.1, 901; 280/848
See application file for complete search history.

(56) References Cited

U.S. PATENT DOCUMENTS

| 3,112,950 | A |   | 12/1963 | Jaskowiak |
| 3,279,843 | A |   | 10/1966 | Hafer et al. |
| 3,388,944 | A |   | 6/1968 | Crehore |
| 3,866,381 | A |   | 2/1975 | Eschbach et al. |
| 5,352,011 | A |   | 10/1994 | Kihara et al. |
| 5,409,283 | A |   | 4/1995 | Ban |
| 5,575,525 | A |   | 11/1996 | Walworth, Jr. et al. |
| 5,741,026 | A |   | 4/1998 | Bonnville |
| 5,897,139 | A |   | 4/1999 | Aloe et al. |
| 5,915,727 | A |   | 6/1999 | Bonnville |
| 6,047,988 | A |   | 4/2000 | Aloe et al. |
| 6,193,273 | B1 |   | 2/2001 | Novak et al. |
| 6,231,995 | B1 |   | 5/2001 | Yamashita et al. |
| 6,742,808 | B1 |   | 6/2004 | Kosak |
| 6,843,519 | B2 |   | 1/2005 | Ojanen |
| 6,979,023 | B2 | * | 12/2005 | Mikasa et al. ............... 280/781 |
| 7,163,259 | B2 | * | 1/2007 | Hayashi ..................... 296/204 |

(Continued)

*Primary Examiner* — Joseph D Pape
*Assistant Examiner* — Dana Ivey
(74) *Attorney, Agent, or Firm* — Jason C. Rogers; Brooks Kushman P.C.

(57) ABSTRACT

A mounting member for securing a vehicle body to a chassis frame includes a horizontal base wall defining a mounting hole used to assemble the body to a receptacle on the frame. The mounting member further includes a plurality of side walls extending from the base wall to connect to a floor panel of the vehicle body. A boss protrudes from the base wall to the floor panel and includes a bore aligned with the mounting hole. The mounting member also includes at least one gusset extending from the boss to the base wall. The base wall, side walls, boss, and the at least one gusset are integrally formed as a single unitary body.

20 Claims, 4 Drawing Sheets

(56) References Cited

U.S. PATENT DOCUMENTS

| | | | |
|---|---|---|---|
| 7,389,977 B1 | 6/2008 | Fernandez et al. | |
| 8,434,749 B2 * | 5/2013 | Rogge et al. | 267/293 |
| 8,636,314 B2 | 1/2014 | Mildner et al. | |
| 2007/0251751 A1 | 11/2007 | Ball et al. | |
| 2012/0313399 A1 | 12/2012 | Caliskan et al. | |
| 2013/0076069 A1 * | 3/2013 | Fuchs et al. | 296/181.2 |

* cited by examiner

CAST LOAD STRUCTURE FOR VEHICLE BODY TO FRAME MOUNT

TECHNICAL FIELD

The present disclosure relates to a vehicle body mounting to a sub-frame.

BACKGROUND

Pickup trucks are motor vehicles with a front passenger cabin, and an open top rear cargo area, often referred to as a box. The box usually has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Passenger cabins and boxes may be separate assemblies or part of a single body structure. Pickup trucks are popular largely because the box allows greater flexibility of use, including carrying a variety of types of cargo and towing various types of trailers.

Traditionally the majority of body structures on pickup trucks have been formed from steel alloys. Through years of experience, pickup truck designers have learned how to engineer steel truck body parts that withstand a variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Certain areas of the body require resilience to frequent high load conditions. For example, mounting locations of the body to a chassis frame receive significant road loads, as the mass of the body rests on these mounting locations. The requirements of the mounting locations increase further for larger vehicles having more mass. The frequency and magnitude of loads input through the mounting locations can reduce overall customer drive quality by adversely affecting noise, vibration, and harshness (NVH) performance.

SUMMARY

In at least one embodiment, a vehicle includes a chassis frame and a passenger cabin having a floor panel mounted to the chassis frame. A die cast unitary mounting member is affixed between the floor panel and the chassis frame. The mounting member is provided with an integral boss defining a bore for receiving a fastener through the mounting member to secure the passenger cabin to the frame.

In at least one embodiment, a mounting member for securing a floor panel to a frame of a vehicle includes a horizontal base wall defining a mounting hole used to assemble the floor panel to a receptacle on the frame. The mounting member further includes a plurality of side walls extending from the base wall to connect to the vehicle floor panel. A boss extends from the base wall into an enclosed section and includes a bore aligned with the mounting hole. The mounting member also includes at least one gusset extending from the boss to the base wall. The base wall, side walls, boss, and the at least one gusset are integrally formed as a single unitary body.

In at least one embodiment, a vehicle includes a floor panel and a chassis frame supporting the floor panel from beneath. The vehicle also includes a mounting member joined to an underside of the floor panel and affixed within a bolted joint to the chassis frame. The mounting member is provided with a boss defining a bore for receiving a bolt. The boss is provided with a height to distribute applied loads from the bolted joint to an area of the floor panel.

In further embodiments, the mounting member may be formed from an aluminum alloy or a magnesium alloy.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
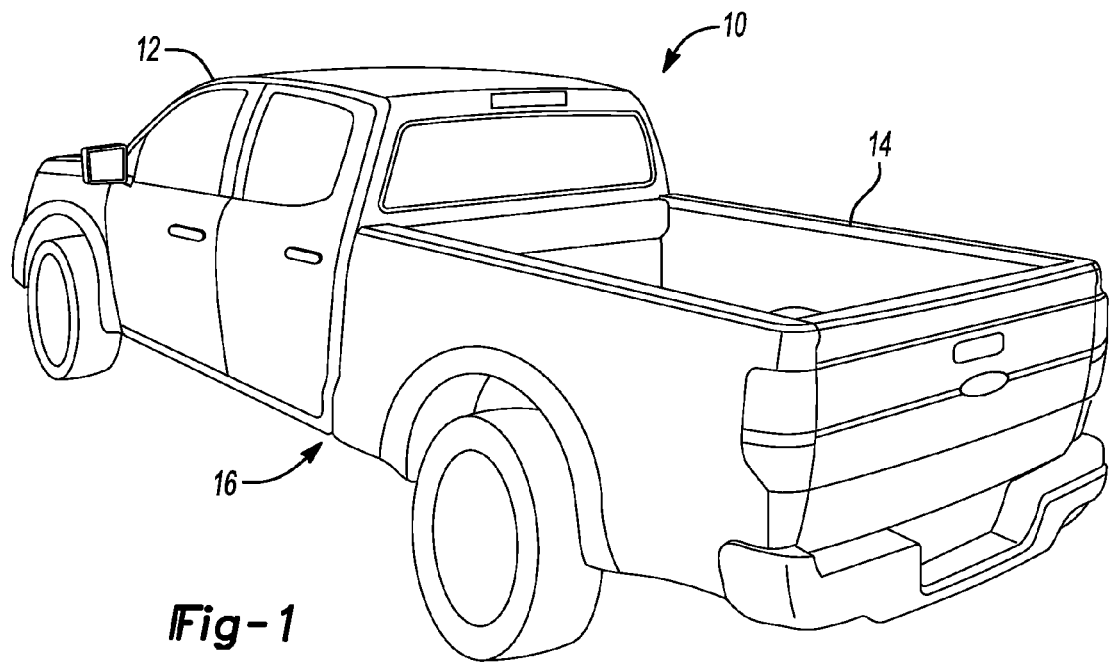
FIG. 1 is a rear elevation view of a vehicle.

FIG. 1 depicts an exterior elevation view of vehicle 10 that includes a passenger cabin 12 at a forward portion, and a cargo box 14 disposed rearward of the passenger cabin 12. Both of the passenger cabin 12 and the box 14 include an assembly of formed metal panels. In at least one embodiment, a substantial portion of the vehicle 10 is formed from a 6000 series aluminum. In other embodiments, a combination of different metals is employed in construction the vehicle 10. The vehicle 10 also includes a chassis frame 16 that provides mounting locations for several major vehicle components including the suspension and wheels, the engine, the drivetrain, the fuel tank, the passenger cabin 12, and the box 14.

Figure 2:
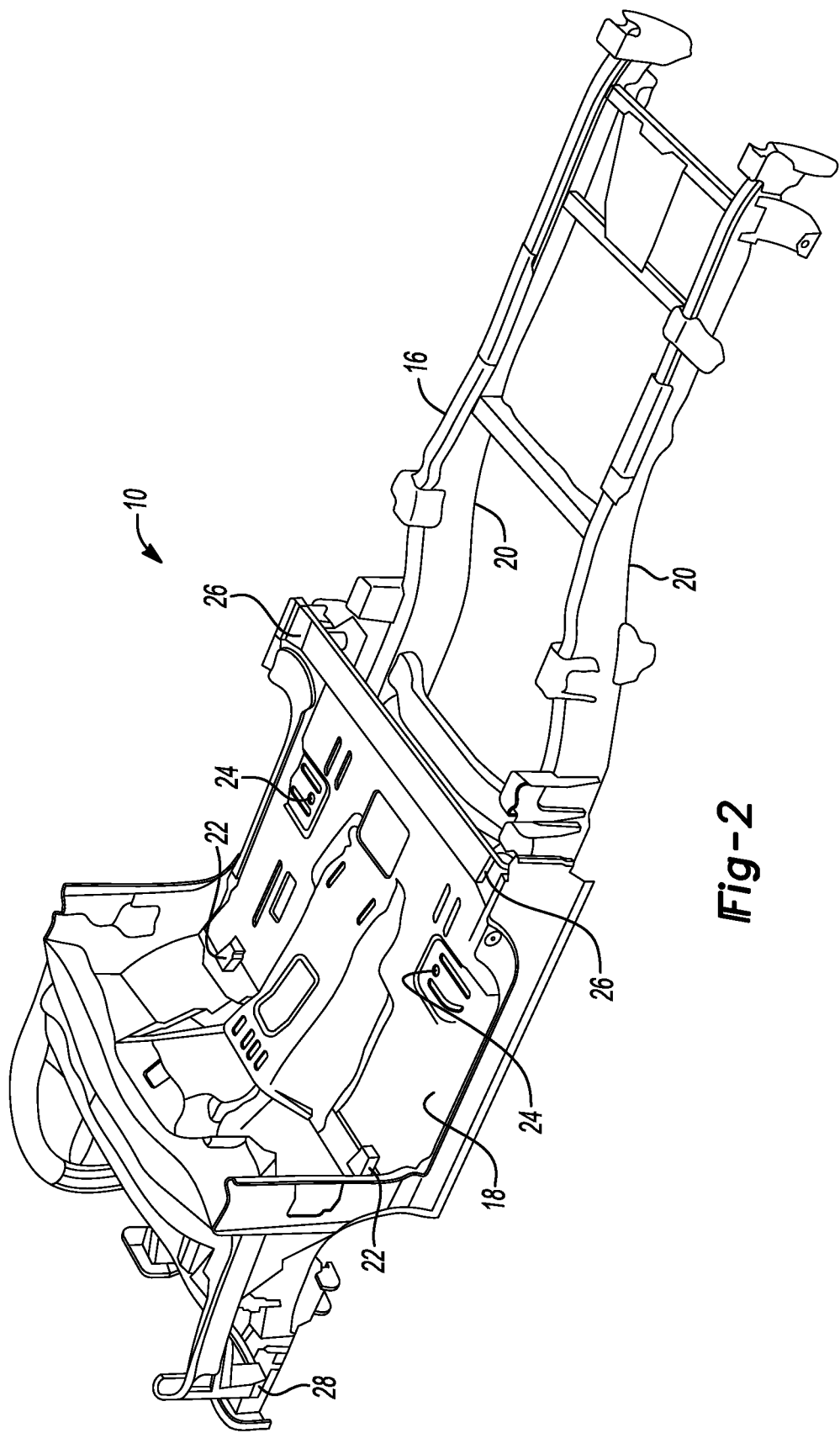
FIG. 2 is a rear elevation view of a cutaway portion of the vehicle of FIG. 1.

Referring to FIG. 2, several outer components of the vehicle 10 are removed to illustrate portions of the underlying structure. An upper portion of the passenger cabin 12, as well as the cargo box 14 is removed from view. The passenger cabin 12 includes a floor panel assembly 18 having several reinforcing parts. The floor panel assembly 18 provides mounting locations for many of the vehicle interior components such as seats, a console, and other trim parts.

The chassis frame 16 extends longitudinally beneath the floor panel assembly 18 and includes a pair of laterally spaced frame rails 20, each on opposing sides of the vehicle 10. The chassis 16 supports the floor panel 18 from beneath. The passenger cabin 12 may be affixed to the chassis frame 16 by a fastener, for example, such as a bolt. The floor panel assembly 18 includes attachment features located at various positions for mounting the passenger cabin 12 to the vehicle chassis frame 16. For example, the floor panel assembly 18 includes a pair laterally spaced forward cabin body mounts 22. Similarly, the floor panel assembly 18 is secured to the chassis frame 16 at mid-cabin body mounts 24. Also, rearward cabin body mounts 26 secure the passenger cabin 12 to the chassis frame 16. The passenger cabin 12 may additionally be secured to the chassis frame 16 in the area of the engine compartment by engine bay body mounts 28. Road loads are transferred during driving from the vehicle wheels to the chassis frame 16. A strategy to manage the transfer of chassis loads into the structure of the passenger cabin 12 may limit noise, vibration, and harshness (NVH) during driving. Structural rigidity is increased at mounting locations of the passenger cabin 12 to distribute loads from the attachment point to the chassis frame 16 to a larger area of the floor panel 18.

Figure 3:
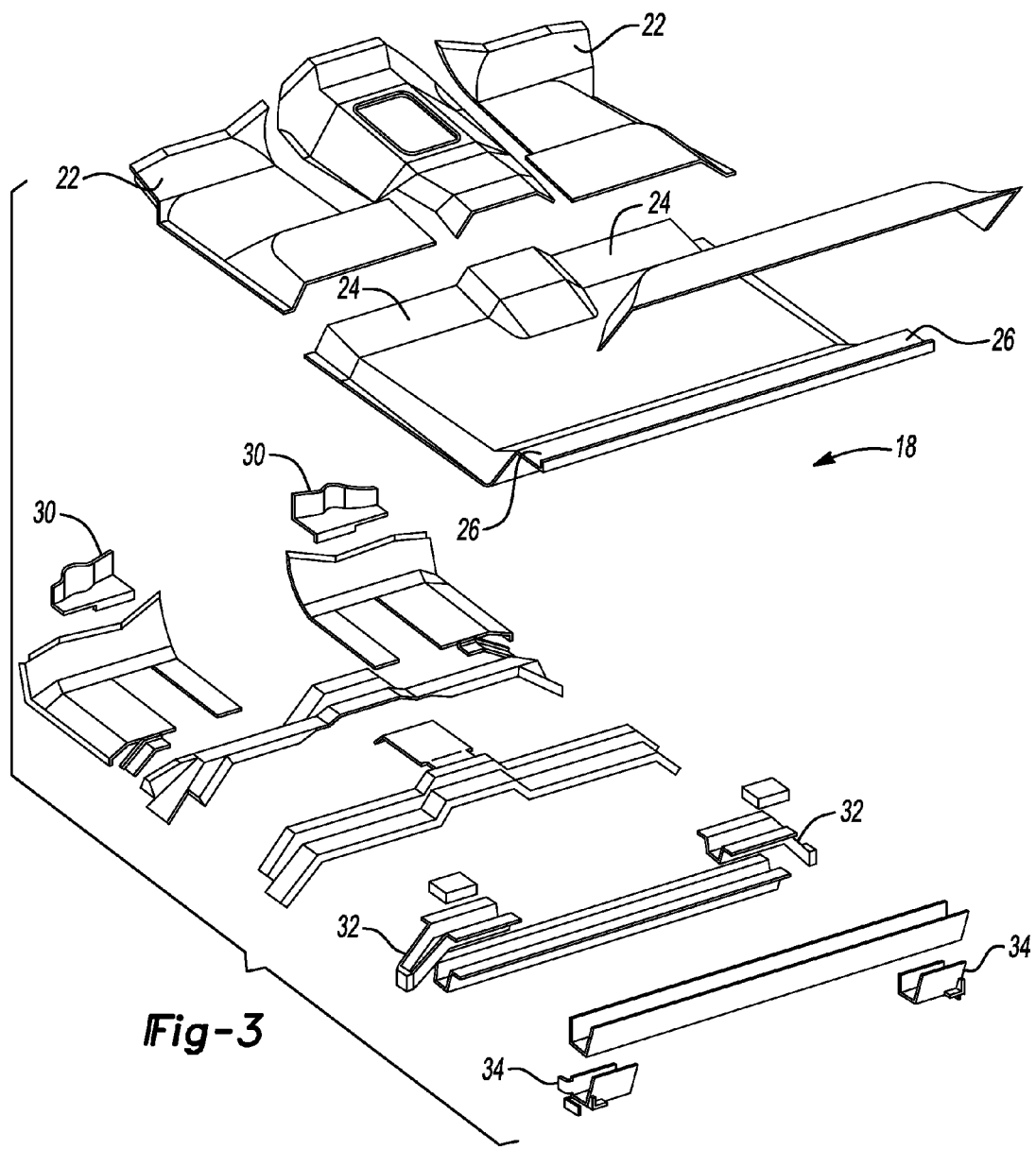
FIG. 3 is an exploded view of a floor panel assembly.

Referring to FIG. 3, a number of supporting reinforcements and cross members may be disposed beneath the floor panel assembly 18. Specifically, local reinforcing components may be disposed at each of the mounting locations where the passenger cabin 12 is secured to the chassis frame 16. A forward mounting member 30 is secured to an underside of the floor panel assembly 18 at each of the forward cabin body mounts 22. A mid-cabin mounting member 32 is similarly secured to the floor panel assembly 18 at each of the mid-cabin body mounts 24. A rear cabin mounting member 34 is secured to the floor panel assembly 18 at the rearward cabin body mounts 26. Each of mounting members increases local point stiffness at each attachment, thereby efficiently distributing loads received at the passenger cabin from the chassis frame 16.

Figure 4:
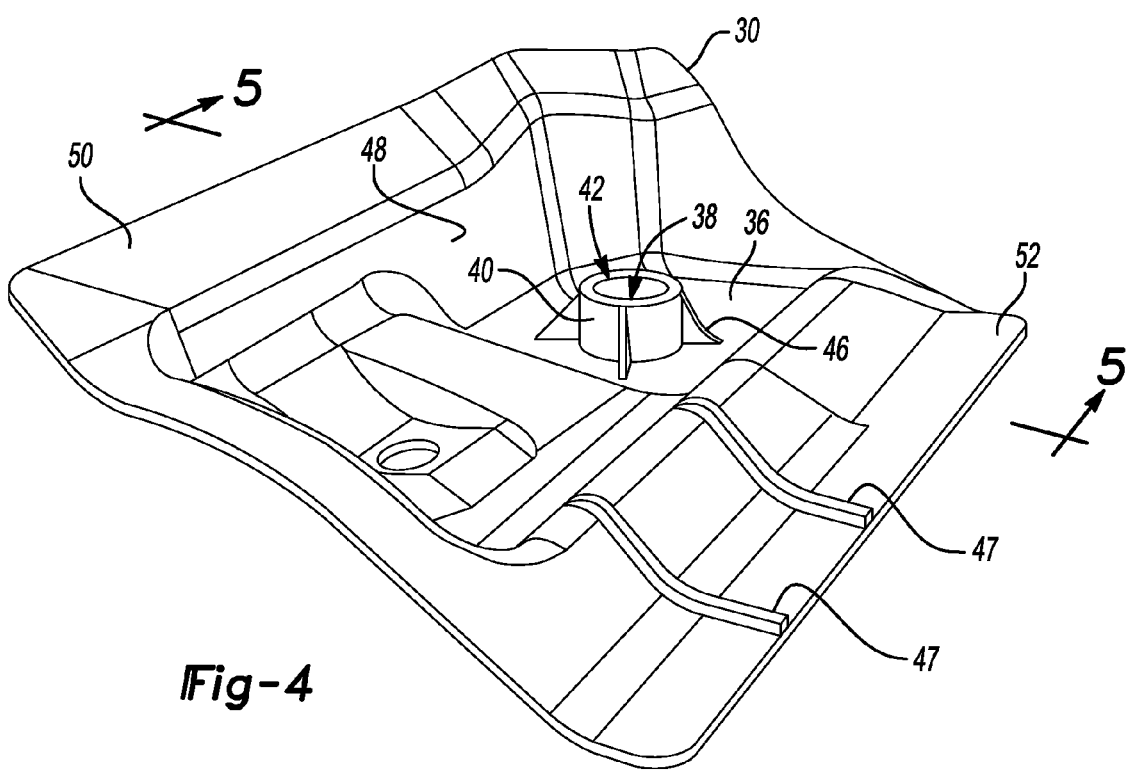
FIG. 4 is a perspective view of a mounting member.

Referring to FIG. 4, an example of a die cast unitary mounting member is depicted. The example shape shown in FIG. 4 may be representative of the forward mounting member 30. The mounting member 30 may be formed from an aluminum alloy, magnesium alloy, or other suitable die cast metals. Die casting the mounting member 30 may provide high dimensional stability while allowing complex shapes and varying wall thickness dimensions. Also, a thin-walled casting shell of aluminum or magnesium in particular may yield a higher strength-to-weight ratio as compared to a mounting member made from an assembly of stamped steel components.

Although a support for the forward cabin body mount 22 is depicted by way of example, a cast reinforcement as disclosed herein may be employed at a number of different body mount positions. As discussed above, mid-cabin body mounts 24, rearward cabin body mounts 26, and engine bay body mounts 28 may each benefit from a load distribution strategy including an integrally formed, unitary body mounting member.

The mounting member 30 includes a horizontal base wall 36 that defines attachment features for securing to a receptacle 37 of the chassis frame 16. The base wall 36 defines a mounting hole 38 for receiving a fastener to secure the mounting member 30 to the chassis frame 16. In at least one embodiment a protuberance, or boss 40, extends from the base wall 36 and defines a bore 42 to allow an extension of the fastener through the boss 40. The mounting member 30 may further include a fixed nut 44 disposed at a distal end of the boss 40. In at least one embodiment, a lateral width of the base wall 36 is substantially less than a lateral width of the entire mounting member 30 to maximize local stiffness at the attachment locations. A flat base portion extending over a large area may reduce local attachment stiffness, and increase the likelihood of flexure near the base of the mounting member 30. In one embodiment, the width of the base wall 36 is about half of the total width of the mounting member.

The mounting member 30 is formed by die casting which allows for the integration of geometric features that may otherwise require additional separate components. At least one gusset 46 extends laterally from the side of the boss 40. Several gussets 46 may be provided in combination to increase the horizontal stiffness of the boss 40, both longitudinally and laterally. In at least one embodiment, the mounting member 30 includes four gussets extending radially from the boss having a relative spacing of about 90 degrees apart around the boss. Also, other rib structures may be integrally formed as part of the unitary body to increase bending stiffness of the part without increasing overall thickness. In alternative embodiments, stiffening ribs 47 may extend orthogonally from portions of the base wall 36 or other side walls to efficiently increase bending stiffness of the mounting member. The ribs 47 may be arranged in a number of different patterns such as parallel adjacent ribs or crosshatched ribs to resist deflection of the mounting member.

At least one generally upright wall 48 extends from the horizontal base wall 36. In further embodiments, a mounting member may include two generally upright walls extending from the base wall such that the mounting member defines a U-shaped cross-section. The two upright walls are disposed on opposing sides of the boss so that the series of interconnected walls encompasses the boss within the U shape. Each of the features of the mounting member 30 may be integrally formed from the casting and be part of a single unitary body. In at least one embodiment, the base wall, at least one side wall, the boss, and a plurality of gussets are all integrated as part of a single piece casting.

As discussed above, mounting member 30 is provided with walls having varying thickness across different locations of the part. Portions of the mounting member 30 that receive higher loads are provided with increased wall thickness as compared to portions receiving lesser loads. In at least one embodiment, the base wall 36 includes a uniform thickness adjacent to the boss 40. In combination, portions of the side walls requiring less load carrying capacity may define a reduced thickness. Similarly, thickness variation at other locations of the mounting member 30 may accommodate other high load locations such as attachment features for other vehicle components. In at least one embodiment, the wall thickness of the of the mounting member 30 varies from about 3 mm up to about 7 mm across various locations of the mounting member.

The mounting member 30 is affixed to the floor panel assembly 18 at both a forward flange 50 and a rearward flange 52 that each extend from a side wall. The corresponding flanges may be joined to the floor panel assembly 18 using a number of different suitable attachment methods including for example: self-piercing rivets, pop rivets, flow-drilling screws, Tox© clinch fastening, welding, adhesives, or a combination of multiple fastening types. The forward and rearward flanges 50, 52 may also have a reduced thickness compared to higher load areas near the boss.

Figure 5:
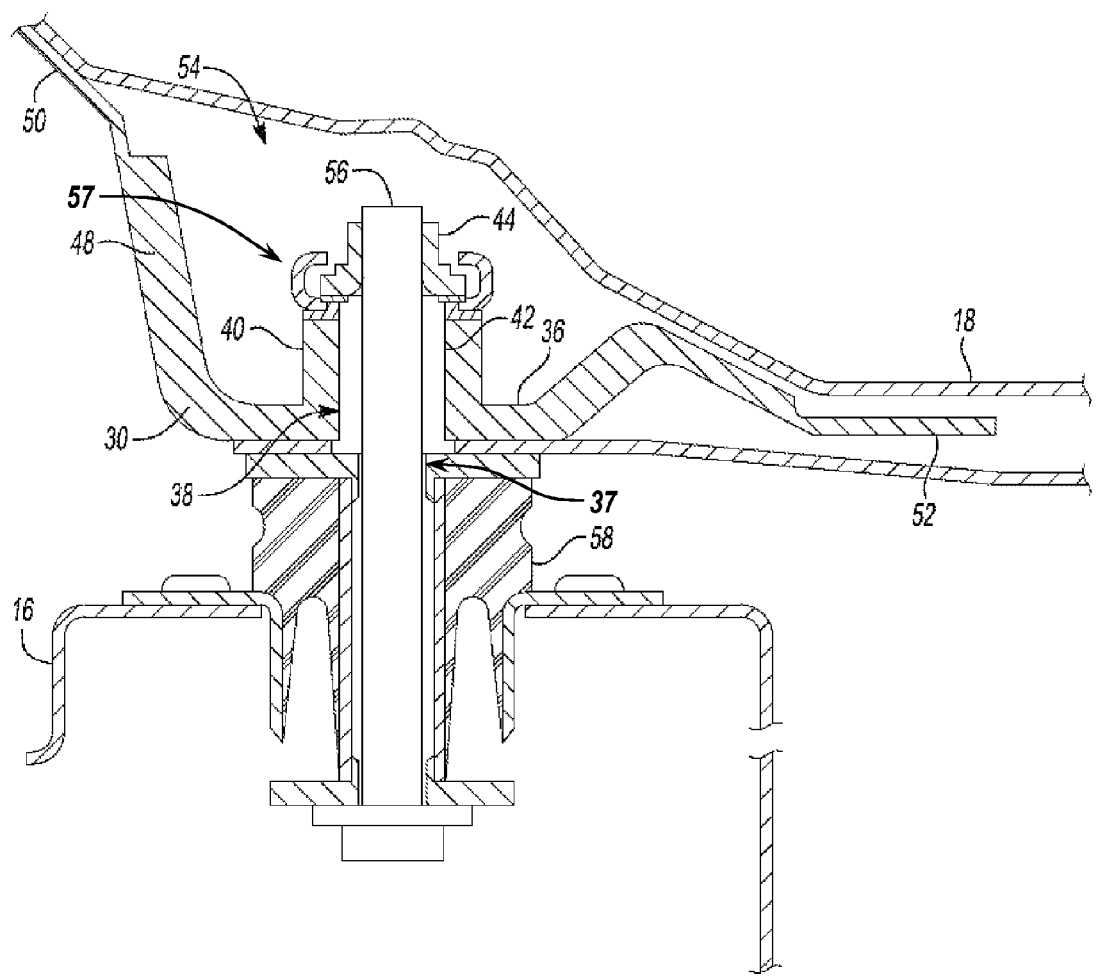
FIG. 5 is a cross section along line 5-5 of FIG. 1.

Referring to the cross section of FIG. 5, a passenger cabin is secured to a chassis frame, and a gap is created between the mounting member 30 and the floor panel assembly 18. The gap defines an internal cavity 54 of an enclosed box section at the mounting location of the passenger cabin 12 to the chassis frame 16. The internal cavity 54 includes space to accommodate an extended height of the boss 40. The fastener may be driven upwardly through the chassis frame 16 and secured to the fixed nut 44 to provide a clamping force to retain the passenger cabin to the chassis frame. An extended length of a fastener 56 through the boss allows transverse and longitudinal loads from the frame to the passenger cabin to be reacted by the fastener 56. The load resistance by the fastener 56 reduces local distortion at base wall 36 near the mounting hole 38. The stiffness of the fastened joint and resistance to moments may vary as a function of the height of the engagement of the fastener 56. The height of the boss 40 transfers load through the perimeter of the mounting member 30 to distribute loads from the bolted joint 57 to a larger area of the floor panel 18. The formation of the enclosed box section increases the overall moment carrying capacity of the fastened joint.

At each of the mounting locations, an isolator bushing 58 is included in the fastened joint between the structure of the passenger cabin 12 and the chassis frame 16. The isolator bushing 58 may be formed from a dense elastomeric material, and is compressively sandwiched within the threaded joint at the fastening location of the passenger cabin 12. However, there may be an upper bound on the amount of distribution that is provided by an elastomer isolator. The structural reinforcements provide a more efficient distribution of loads from the chassis into the passenger cabin. In at least one embodiment, a plurality of mounting members are disposed beneath the floor panel to reinforce the mounting locations.

By increasing stiffness and efficiently using the shape of the mounting members themselves, thinner part gages can be achieved, saving both cost and weight. The integration of the attachment boss and stiffening features may add less cost and weight compared to increasing the overall thickness of the entire mounting member. Added cost savings and reduced assembly steps may be realized by eliminating a mounting member reinforcement assembled from separate stamped components.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
   a floor panel;
   a chassis frame supporting the floor panel from beneath; and
   a mounting member joined to an underside of the floor panel and affixed within a bolted joint to the chassis frame, the mounting member including a boss defining a bore for receiving a bolt, wherein a height of the boss increases an engagement length between the bolt and the chassis frame to distribute loads from the bolted joint,
   wherein the mounting member defines a plurality of stiffening ribs extending from a horizontal base wall.

2. The vehicle of claim 1 wherein the mounting member is joined to the floor panel at a forward flange and a rearward flange with respect to the boss to define a closed box section encompassing the boss.

3. The vehicle of claim 1 wherein the boss protrudes perpendicularly from a horizontal base wall, and wherein the mounting member defines a plurality of gussets extending from the boss and connected to the base wall.

4. The vehicle of claim 3 wherein the plurality of gussets comprises four gussets extending radially from the boss at a spacing of about 90 degrees about the boss.

5. The vehicle of claim 1 wherein the mounting member is a thin-walled casting shell having a plurality of interconnected walls, the walls having varying thicknesses in a range from about 3 mm to about 7 mm.

6. The vehicle of claim 1 wherein floor panel and the mounting member are formed from an aluminum alloy.

7. The vehicle of claim 1 wherein the mounting member is die-cast.

8. A vehicle comprising:
   a chassis frame;
   a floor panel supported by the chassis frame at a mounting location;
   a mounting member joined to the floor panel and positioned between the floor panel and the chassis frame at the mounting location, the mounting member including a boss defining a bore there-through and a plurality of gussets extending from the boss; and
   a fastener connecting the chassis frame and mounting member through the bore.

9. The vehicle of claim 8 wherein a height of the boss extends away from the chassis frame to increase an engagement length between the fastener and the chassis frame to distribute loads from the mounting location.

10. The vehicle of claim 8 wherein the boss extends perpendicularly from a horizontal base wall of the mounting member.

11. The vehicle of claim 8 wherein the mounting member defines a plurality of stiffening ribs extending from a horizontal base wall.

12. The vehicle of claim 8 wherein the mounting member is die-cast.

13. The vehicle of claim 8 wherein floor panel and the mounting member are formed from an aluminum alloy.

14. The vehicle of claim 8 wherein chassis frame does not directly contact the floor panel and mounting member.

15. The vehicle of claim 8 wherein the plurality of gussets comprises four gussets extending radially from the boss.

16. A vehicle comprising:
   a chassis frame;
   a floor panel supported by the chassis frame at a mounting location; and
   a die-cast mounting member positioned between the floor panel and chassis frame and having an integrally formed boss defining a bore there-through,
   wherein the mounting member is joined to the floor panel along flanges having a wall thickness being less than a bore-wall thickness.

17. The vehicle of claim 16 wherein chassis frame is connected to the mounting member with a bolt and does not directly contact the floor panel and mounting member.

18. The vehicle of claim 17 wherein a height of the boss extends away from the chassis frame to increase an engagement length of the bolt.

19. The vehicle of claim 16 wherein the mounting member includes a plurality of gussets extending from the boss.

20. The vehicle of claim 16 wherein the mounting member defines a plurality of stiffening ribs extending from a horizontal base wall.

* * * * *